US012739614B2

(12) United States Patent
Braga Júnior et al.

(10) Patent No.: US 12,739,614 B2
(45) Date of Patent: Sep. 15, 2026

(54) METHOD PERFORMED BY A DUAL-SIM UE, A SECOND NETWORK NODE (PLMN-1) AND A THIRD NETWORK NODE (PLMN-2), OPERATING IN A WIRELESS COMMUNICATION NETWORK

(71) Applicant: SAMSUNG ELETRÔNICA DA AMAZÔNIA LTDA., Manaus (BR)

(72) Inventors: Iran Mesquita Braga Júnior, Manaus (BR); Daniel Da Silva Souza, Manaus (BR); Bruno Sátiro Da Silva, Manaus (BR); Dercio Manuel Mate, Manaus (BR); Edemir Marcus Carvalho De Matos, Manaus (BR)

(73) Assignee: SAMSUNG ELETRÔNICA DA AMAZÔNIA LTDA., Campinas (BR)

( * ) Notice: Subject to any disclaimer, the term of this patent is extended or adjusted under 35 U.S.C. 154(b) by 211 days.

(21) Appl. No.: 18/806,070

(22) Filed: Aug. 15, 2024

(65) Prior Publication Data

US 2025/0330796 A1 Oct. 23, 2025

(30) Foreign Application Priority Data

Apr. 18, 2024 (BR) ...................... 10 2024 007663 0

(51) Int. Cl.
*H04W 8/18* (2009.01)
*H04W 84/04* (2009.01)
*H04W 88/06* (2009.01)

(52) U.S. Cl.
CPC ............ *H04W 8/18* (2013.01); *H04W 84/042* (2013.01); *H04W 88/06* (2013.01)

(58) Field of Classification Search
CPC ..... H04W 8/18; H04W 84/042; H04W 88/06; H04W 8/183; H04W 60/005; Y02D 30/70
USPC .......................................................... 455/418
See application file for complete search history.

(56) References Cited

U.S. PATENT DOCUMENTS

| | | | | |
|---|---|---|---|---|
| 9,813,989 B2 | 11/2017 | Su et al. | | |
| 2010/0279698 A1* | 11/2010 | Wong | H04W 88/06 | 455/450 |
| 2014/0200048 A1* | 7/2014 | Cheng | H04W 48/18 | 455/558 |
| 2015/0065132 A1* | 3/2015 | Ramkumar | H04W 48/16 | 455/435.2 |
| 2015/0181506 A1* | 6/2015 | Ravuvari | H04W 76/19 | 455/434 |
| 2017/0013583 A1* | 1/2017 | Chen | H04W 76/18 | |

(Continued)

FOREIGN PATENT DOCUMENTS

| | | | |
|---|---|---|---|
| EP | 4152818 A1 | 3/2023 | |
| WO | WO 2021219043 A1 | 11/2021 | |

OTHER PUBLICATIONS

Novel C-DRX Mechanism for Multi SIM Multi Standby UEs in 5G and B56 Networks, published in 2020, by S. C. Sundararaiu et al.

*Primary Examiner* — Don N Vo

(57) ABSTRACT

The present invention describes a method for adjusting dynamically power saving mechanisms in Dual-SIM devices, considering different 5G and beyond networks inter-communication. Specifically, the present invention details the signaling and methodology for inter-network operation regarding the use of the proposed feature. Particularly, the present invention relates to a signaling method for enabling single stack mode (SSM) operation for power saving in Dual-SIM devices.

18 Claims, 8 Drawing Sheets

(56) References Cited

U.S. PATENT DOCUMENTS

2021/0120524 A1 4/2021 Palle et al.
2022/0240213 A1* 7/2022 Ly ......................... H04W 48/18

* cited by examiner

METHOD PERFORMED BY A DUAL-SIM UE, A SECOND NETWORK NODE (PLMN-1) AND A THIRD NETWORK NODE (PLMN-2), OPERATING IN A WIRELESS COMMUNICATION NETWORK

CROSS-REFERENCE TO RELATED APPLICATION(S)

This application is based on and claims priority under 35 U.S.C. § 119 to Brazilian Patent Application No. BR 10 2024 007663 0, filed on Apr. 18, 2024, in the Brazilian Intellectual Property Office, the disclosure of which is incorporated by reference herein in its entirety.

TECHNICAL FIELD

The present invention relates to the field of wireless communication networks. Particularly, the present invention relates to a signaling method for enabling single stack mode (SSM) operation for power saving in Dual-SIM devices.

With the advent of mobile networks up to the fifth generation (5G New Radio) and planning beyond technologies, new functionalities have been embedded in mobile devices, improving the overall quality of experience (QoE). Aiming at greater freedom for the user and interoperability between different access networks, devices supporting multiple subscriber Identity Module (SIM) cards have been increasingly common in the market, especially Dual-SIM smartphones. With this possibility, users can activate internet packages or voice calls using different operators, taking advantage of better rates and service coverage. For instance, with the use of two SIM cards, a personal number and a professional number can be adopted.

In terms of security, it is possible to have two security keys registered in the same device. Thus, in case of forgetting the password of one number, the password of the other can be used to access the device. Another interesting factor aimed a security is the possibility of two-factor authentication, adding another layer of security via SMS. However, as the mobile device has more than one SIM card, the power consumption becomes higher due to the multiple radio operations required for both slots, such as network monitoring to detect incoming data. In this context, solutions regarding battery consumption reduction for Dual-SIM mobile devices are encouraged.

BACKGROUND OF THE INVENTION

The demand for data applications on wireless communications has grown exponentially in the last years, which has raised the need for more efficient utilization of the resources of the network. In addition, since the mobile devices are, in general, battery-limited, the development of solutions with high energy efficiency plays a crucial role in current wireless communication systems.

Multi-SIM multi-standby (MSMS) feature-enabled user equipment (UEs) are expected to dominate the smartphone market in the future due to the facilities and configurability. However, considering that most MSMS devices have only one radio frequency integrated circuit (RFIC), innovative strategies aimed at the shared use of the radio frequency system are important for a more efficient usage of the hardware, as well as to minimize battery consumption.

In general, an operator network—public land mobile network (PLMN)—can act on consumption optimization strategies only in relation to its respective SIM, sending and receiving information that provides a correct decision making. Therefore, when a device is considered with two SIM cards from different operators, i.e., different PLMNs, control methods that consider the operation of both slots (SIM cards) of the device become a great challenge in view of the need to exchange information between different networks to make decisions for power saving. This networks coop-work becomes fundamental in scenarios with multiple SIMs for a better usage of the UE battery, improving features such as Paging and Discontinuous Reception (DRX).

Discontinuous reception has been considered a very interesting solution to achieve power-saving requirements since previous mobile system generations. DRX is based on switching the UE radio circuitry to sleep mode when there is no data exchange service. In sleep mode, the UE is not monitoring the physical downlink control channel (PDCCH).

Although, even while there is no traffic, the UE must be on to listen to the control signaling sent from the network and decode them. Adopting an approach in which the UE is always-on is inefficient in terms of battery consumption. In this context, the DRX uses a strategy based on the punctual decoding of the control channel in the downlink of wireless communications systems, leading the UE to sleep during a predetermined interval and wake up to decode the control signal using a predetermined interval as well.

The RFIC usage for each SIM is performed in a time-sliced manner, i.e., a dedicated time is defined for each SIM, thus, when one SIM is turned to DRX sleep, RFIC cannot be turned off for its entire sleep duration as the same RFIC shall be used by the second SIM (considering a Dual-SIM device) to communicate with its associated network. In this context, multi-SIM functionality tends to increase the energy consumption, leading to faster battery drain compared to single SIM.

Multi-SIM UEs are attractive because allow getting services from different operators anytime and anywhere, FIG. 1 illustrates a Dual-SIM UE communicating with two distinct PLMNs. However, UEs with two (or more) active SIM cards tend to consume twice (or more) as much energy when compared to single SIM devices. Indeed, each slot can, independently, scan different PLMNs, neighboring cells and perform measurements. Moreover, Dual-SIM devices share the same RFIC due to cost and space limitation.

In this context, the usage of RFIC increases for Dual-SIM devices even when considering DRX, since the RFIC can be used by a given SIM while another one is in sleep mode. In addition, due to sharing of resources, the performance of other KPIs also tends to be degraded, such as the overall throughput.

Therefore, considering Dual-SIM UES, the following problems must be solved:

- how to reduce power consumption in Dual-SIM devices,
- how can the system KPIs be enhanced when using Dual-SIM configuration,
- what kind of information the network nodes can exchange to enable efficient resource usage in Dual-SIM UEs.

The article entitled "Novel C-DRX Mechanism for Multi SIM Multi Standby UEs in 5G and B5G Networks", published in 2020, by S. C. Sundararaju et al. In this study, a new C-DRX mechanism is presented, in which UEs shall optimally compute C-DRX configuration based on overall RFIC ON duration considering the events of other SIMs too and share it with 5G networks. Unlike this reference, the method of the present invention is based on the signaling exchange between different networks nodes, which improves power saving by enabling SSM at the UE. Also, this invention can be more efficient when compared to the Reference [1] solution, where no local processing is needed, leading to low power consumption and reduced signaling overhead.

Additionally, in the cited article, the authors present a method for power saving in Dual-SIM devices based on a local computation (UE-based) of C-DRX configuration accordingly to the overall RFIC usage. Accordingly with this method, the computed C-DRX configuration is afterward sent to the network, which confirms and sends back to the UE the proper C-DRX configuration. In contrast, the method of the present invention is based on the signaling exchange between different networks nodes, which improves power saving by enabling SSM at the UE. Also, the present invention can be more efficient, whereas no local processing is needed, leading to low power consumption and reduced signaling overhead.

Patent document WO 2021219043 A1, entitled "SERVICE INDICATION METHOD, TERMINAL AND NETWORK DEVICE", published on Nov. 4, 2021, by China Mobile Communication Co., LTD e China Mobile Communications Group Co., LTD. The method of document WO 2021219043 comprises an indication signal where the SIM-1 receives a service indication to SIM-2, then the UE judges whether to switch to SIM-2 to perform the service. SIM-2 is in idle or inactive state before the service indication. However, this method does not consider SSM operation and the communication between different PLMNs is ignored. Additionally, this method does not consider network KPIs or UE status, which may degrade the system's performance.

Additionally, patent document WO 2021219043 A1 aims to save power in multi-card devices by creating a service indication method, which consists of a wakeup signal sent by PLMN-1 to SIM-1 indicating that there is an incoming service from PLMN-2 to SIM-2. However, this method does not consider SSM operation and the communication between different PLMNs is ignored. In addition, this method does not consider network KPIs or UE status, which may degrade the system performance.

U.S. Pat. No. 9,813,989 B2, entitled "POWER REDUCTION TECHNOLOGIES FOR DUAL-SIM DEVICES", published on Nov. 7, 2017, by Apple Inc. This proposal comprises a method in which the SIM-1 performs registration on a local network using a first protocol stack. Then, it is verified if the local network is available for SIM-2, i.e, whether the SIM-2 can be registered in local network. If so, the SIM-2 also performs registration using a first protocol stack, then SIM-1 monitors the paging for other SIMs. Otherwise, SIM-2 uses a second protocol stack for registration. Although this method enables registration using a single protocol stack, it also ignores the exchange of information between different PLMNs, as well as the network KPIs and UE status, leading to low resource efficiency.

Additionally, patent document U.S. Pat. No. 9,813,989 B2 proposes a method for registering a SIM-2 card using protocol stack 1. Although this method enables registration using single protocol stack, it also ignores the exchange of information between different PLMNs, as well as the network KPIs and UE status, leading to low resource efficiency.

Patent document EP 4152818 A1, entitled "BASE STATION SWITCHING METHOD AND APPARATUS, COMMUNICATION DEVICE AND STORAGE MEDIUM", published on Mar. 22, 2023, by Apple Inc. The cited patent application describes a base station switching method and apparatus, a communication device and a storage medium. The method comprises: in response to a terminal, switching a first SIM from a first base station to a second base station, sending information of a second SIM to the second base station, wherein information of the second SIM is used for enabling the second SIM in an inactive state to reside in the second base station, and the first SIM is in a connected state.

Patent document US 2021/0120524 A1, entitled "USER EQUIPMENT OPERATION WITH MULTIPLE SUBSCRIBER IDENTITY MODULES", published on Apr. 22, 2021, by INTEL CORPORATION. Said patent application provides targeted embodiments of multi-SIM operation by a UE communicating with a network and describes corresponding actions taken on both the network and the UE. In some embodiments, collaboration between the network and the UE in multi-SIM operation may result in effective use of radio resources by participating network k nodes and avoid data connection drops, which in turn may help provide a more positive user experience.

SUMMARY

The solution disclosed in the present invention is a new signaling method that allows enabling SSM in Dual-SIM UEs for reducing power consumption and improving system performance. Specifically, the UE requests initial registration in PLMN-1 for SIM-1 using protocol stack 1. Similarly, the UE requests initial registration in PLMN-2 for SIM-2 using protocol stack 2. Based on UE battery level, the temperature of the device or another UE feature, the UE sends a request from SIM-2 using protocol stack 2 to enable SSM and indicating that SSM will be operated using SIM-1 and PLMN-1. After that, PLMN-2 contacts PLMN-1 to check the availability and request SSM operation.

Conforming to the proposal, if PLMN-1 is available for SSM, it receives a set of information from PLMN-2 to assist the computation of the SSM parameters. PLMN-1 also can exchange information with UE using protocol stack 1 to update the SSM parameters. Utilizing a pre-determined algorithm, PLMN-1 computes the SSM parameters based on information obtained from PLMN-2 and from the UE. After defining the SSM parameters, PLMN-1 sends a message to configure the UE and start the SSM.

Once the SSM is started, protocol stack 2 is disabled and information can be received only from PLMN-1 using protocol stack 1. When a new data service arrives to SIM-2, PLMN-2 must send a message to PLMN-1 indicating this new service. Then, PLMN-1 forwards the service indication to SIM-1 using protocol stack 1. After receiving the service indication, the UE must enable SIM-2 and start protocol stack 2 and request the service from PLMN-2. According to the invention, after finalizing a data transmission, the UE may continue or not in SSM. If the UE continues in SSM, PLMN-1 may update the SSM settings and send to UE, which may then enter in the SSM again. Otherwise, the SSM is finished, and conventional Dual-SIM mode is used.

In the prior art, there is no mention to practical solution for reducing power consumption in Dual-SIM UEs regarding the practical signaling needed for inter-network operation.

DETAILED DESCRIPTION OF INVENTION

The main idea of the present invention is a signaling method that makes it possible the exchange of a limited amount of information between different network nodes (including network operators with distinct PLMNs) to enable a SSM regarding power saving in Dual-SIM devices. Considering the higher battery consumption due to the two slots being active, the method of the present invention allows the UE to request (according to previously established parameters, such as low battery level) the activation of SSM to one of the networks where it is connected, so that only one slot will be responsible for processing both SIM cards, which provides substantial battery savings for the device.

Therefore, the execution of the method of the present invention assumes that the UE supports two or more SIM cards. Moreover, SIM-1 is a subscriber of PLMN-1 and SIM-2 is a subscriber of PLMN-2, where PLMN-1 and PLMN-2 can be different operators or not. The communication between SIM-1 and PLMN-1 is performed using protocol stack 1 whereas the communication between SIM-2 and PLMN-2 is performed using protocol stack 2. Moreover, in the case in which PLMN-1 and PLMN-2 are different, it is assumed that there is an agreement between PLMN-1 and PLMN-2, which specifies where each process step will be offered and specifies the technical and commercial components necessary to enable that service. For instance, 3GPP standardized interfaces N8, N12, N16 and N27 may be used for communication between network functions from PLMN-1 and PLMN-2, in addition, to ensure end-to-end confidentiality and/or integrity between PLMN-1 and PLMN-2 communication, all control plane traffic between PLMN-1 and PLMN-2 may be routed through the Security Edge Protection Proxy (SEPP).

Figure 1:
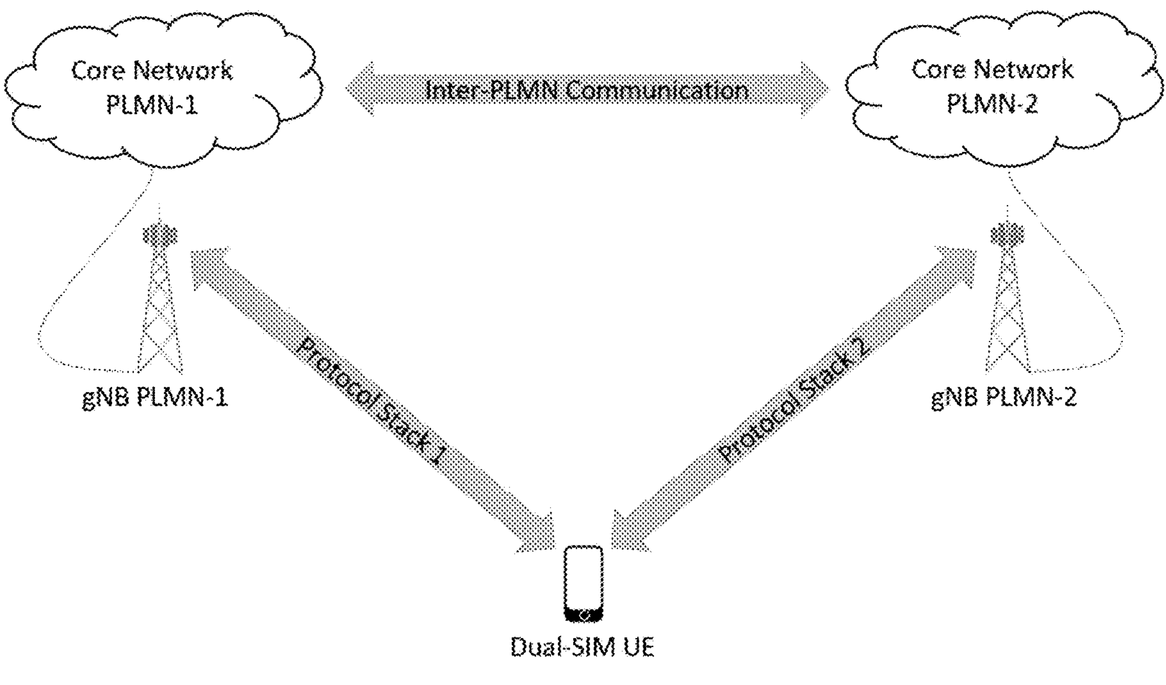
FIG. 1 illustrates a scenario with Dual-SIM UE communicating with two distinct PLMNs according to an embodiment of the present invention.
Figure 2:
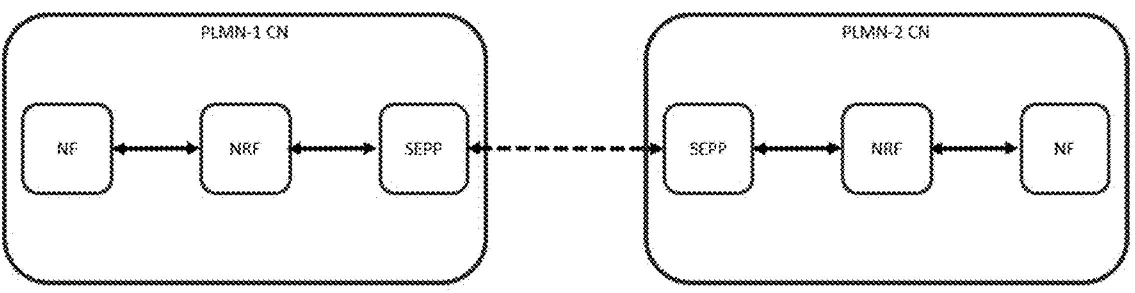
FIG. 2 illustrates an inter-PLMN communication according to an embodiment of the present invention.
Figure 3:
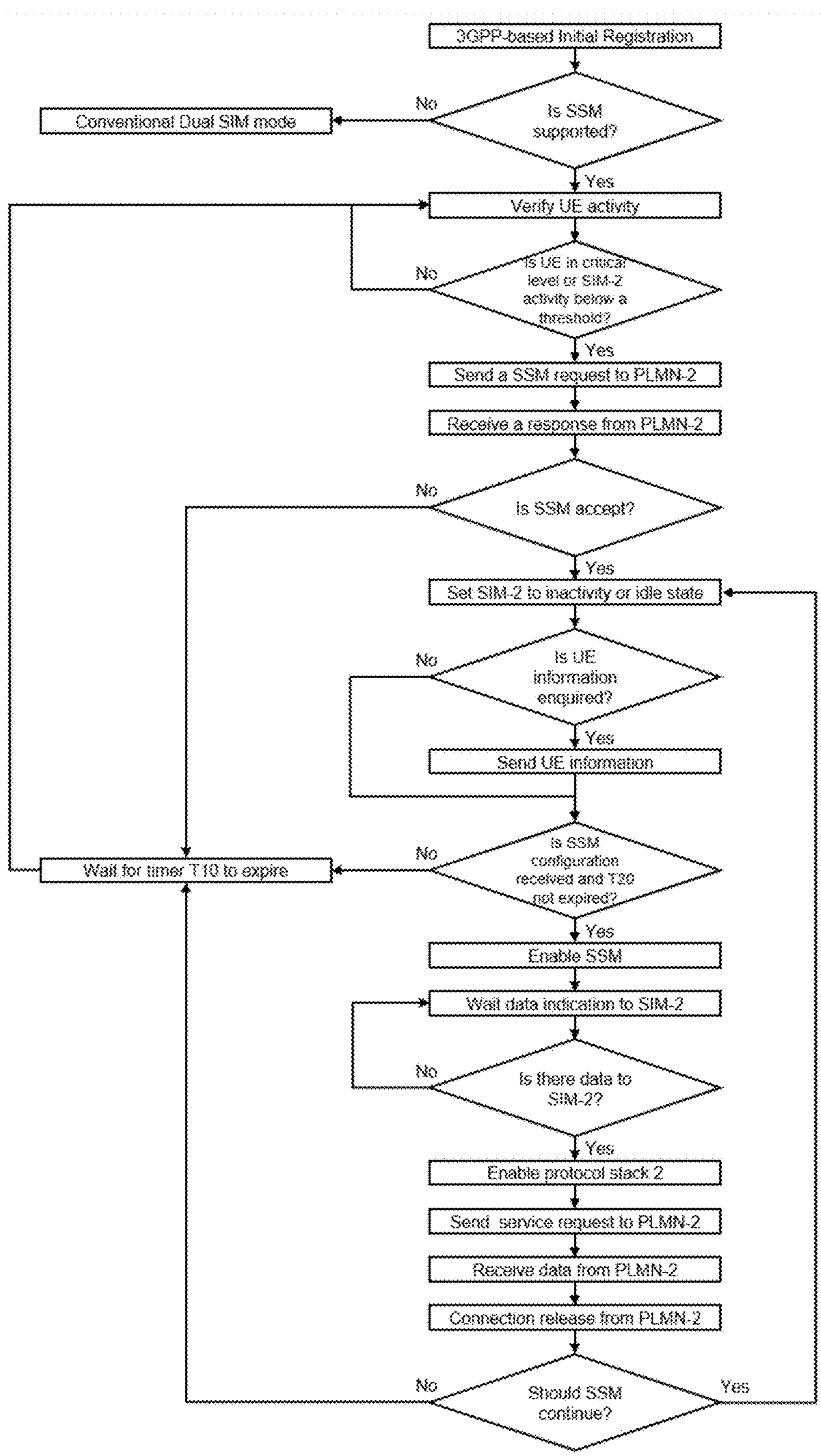
FIG. 3 shows a flowchart of the steps executed by the UE according to an embodiment of the present invention.
Figure 4:
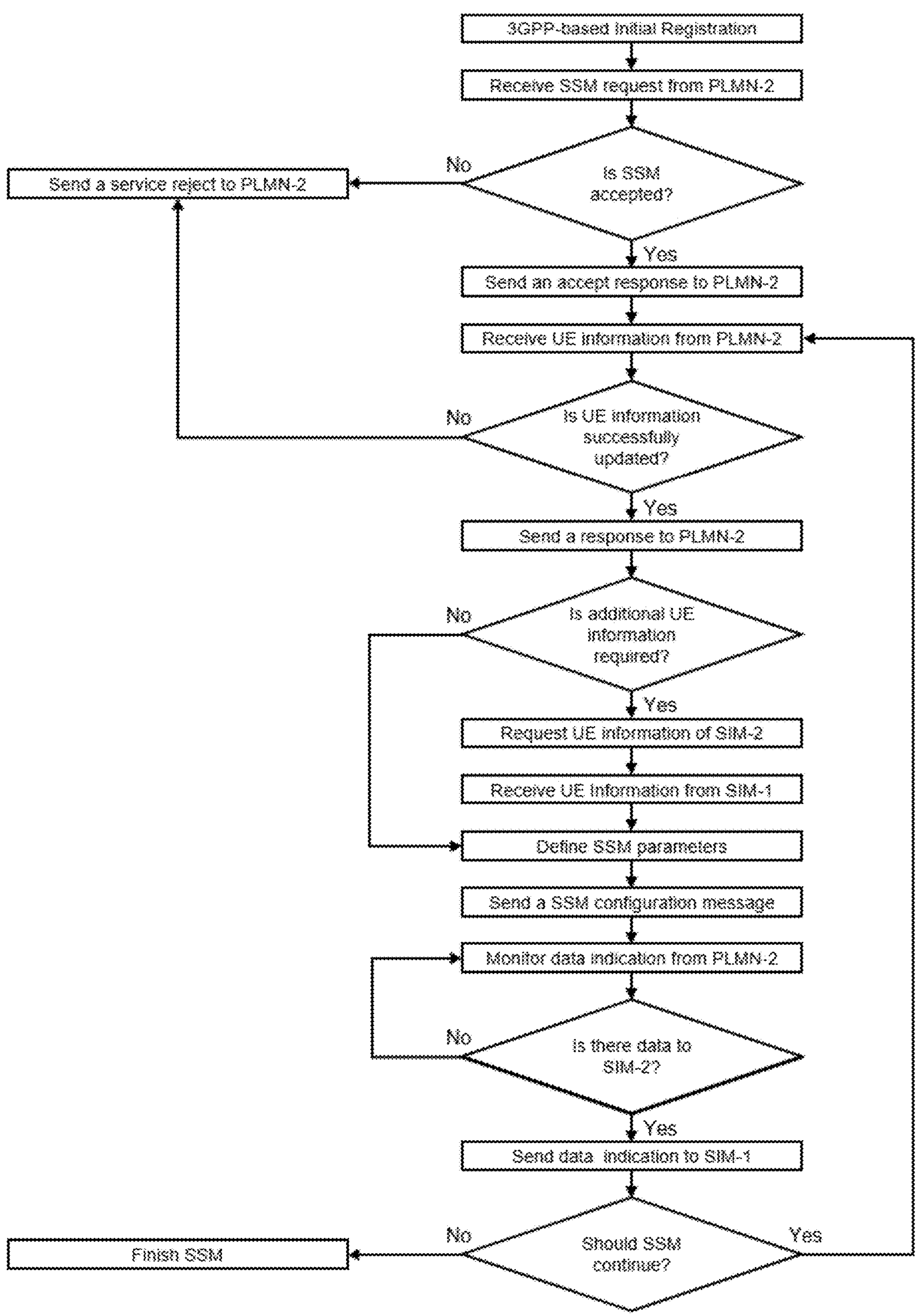
FIG. 4 shows a flowchart of the steps executed by PLMN-1 according to an embodiment of the present invention.
Figure 5:
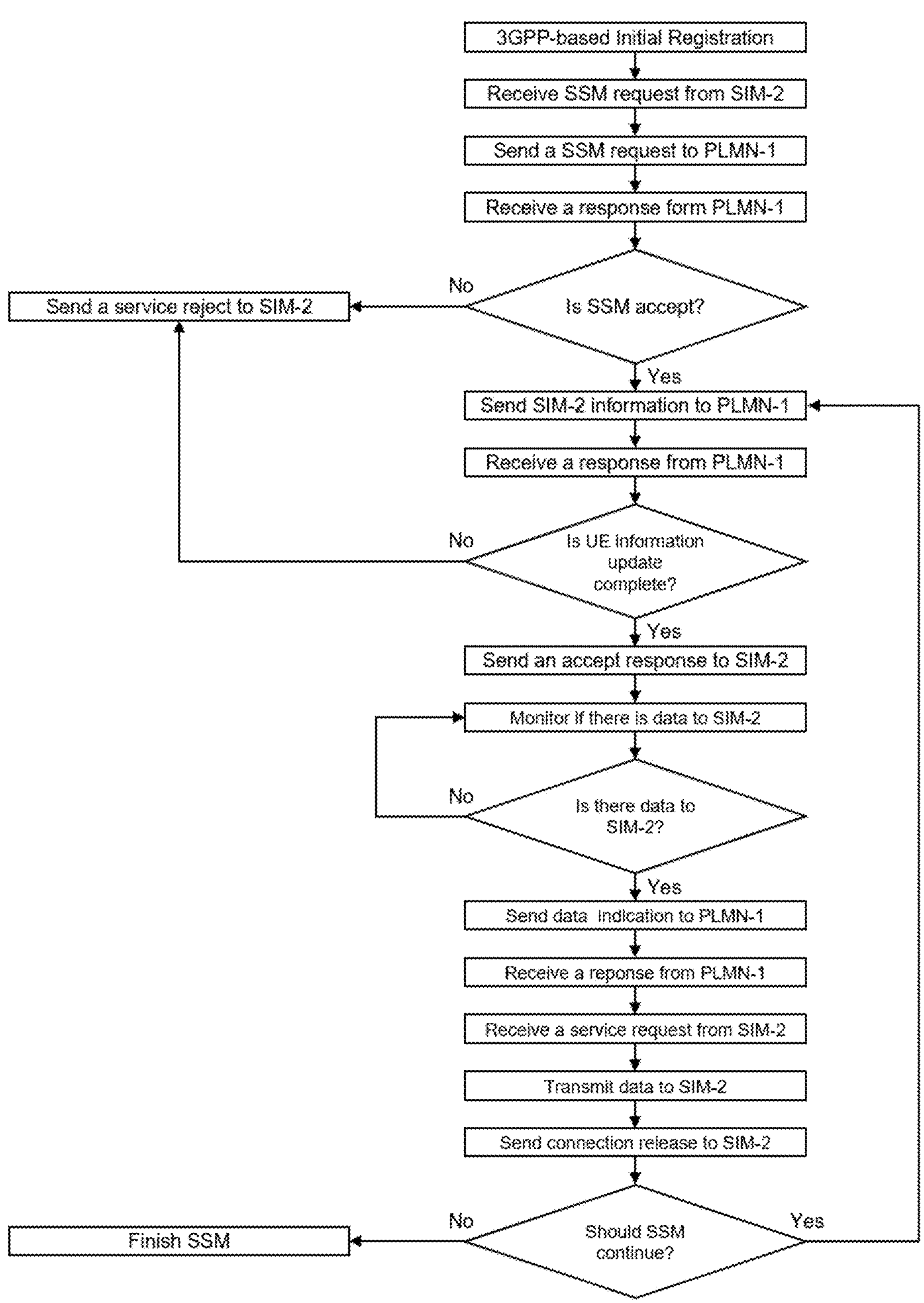
FIG. 5 shows a flowchart of the steps executed by PLMN-2 according to an embodiment of the present invention.

Generally, each PLMN is related to one core network (CN), which coordinates the network functionalities. Also, the present invention focuses on 5G roaming architecture. Then, when PLMN-2 needs to communicate with a PLMN-1, the network function (NF) responsible for managing SSM in PLMN-2 requests it to the Network Repository Function (NRF) from PLMN-2 CN, which, in turn, forwards the request to the NRF from the PLMN-1's CN to reach the NF responsible for managing SSM in PLMN-1. The same flow is considered when the PLMN-1 network function intends to reach PLMN-2 NF. The inter-PLMN communication is illustrated in FIG. 2. Note that all communication passes through the SEPP. The following sections may find all the details on how the NFs are performed.

The method at the UE comprises the steps of performing the existing 3GPP-based initial registration procedure, verifying the UE activity, if the UE is in a critical level or the SIM-2 activity is below a threshold, sending a SSM service request message to PLMN-2 using SIM-2 and protocol stack 2, receiving a response message from PLMN-2 using SIM-2 and protocol stack 2 indicating if the SSM request is accepted or not, optionally, receiving a UE assistance information enquiry message from PLMN-1 using SIM-1 and protocol stack 1, optionally, sending a UE assistance information using SIM-1 and protocol stack 1, receiving a SSM configuration message from PLMN-1 using SIM-1 and protocol stack 1, waiting an indication to SIM-2 from PLMN-2 using SIM-1 and protocol stack 1, if Data service indication message is received, sending a service request to PLMN-2 using SIM-2 and protocol stack 2, receiving data from PLMN-2, and receiving Connection release message from PLMN-2 using SIM-2 and protocol stack 2.

Initial Registration is the basic step related to connecting the UE to the mobile network. Due to Dual-SIM support, the UE must perform initial registration of SIM-1 in PLMN-1 using protocol stack 1 and perform initial registration of SIM-2 in PLMN-2 using protocol stack 2. During registration, the UE may send a FLAG-01 indicating that it supports SSM, using ueCapabilityInformation message.

PLMN-1 and PLMN-2 may send a FLAG-02 (e.g., using rrcReconfiguration message) allowing the device to request SSM when needed. The UE is enabled to request SSM only when both PLMN send FLAG-02. Moreover, FLAG-02 may be updated periodically, on demand, or when mobility is performed. If FLAG-02 is set to FALSE, conventional Dual-SIM mode must be used.

In one embodiment, during the verification of the UE activity step, the UE must periodically verify whether or not the SIM-2 was recently used for any data transmission. Thus, a timer T01 can be set to monitor the SIM-2 activity. Moreover, timer T01 must be restarted always when a new data activity is perceived in the SIM-2.

In another embodiment, the UE must verify periodically different system parameters such as battery level, processing, temperature and so on. The UE can define a critical level for each analyzed parameter, e.g., the UE can be in a critical level when the battery level is below 5% or the processing is next to the supported limit.

If the UE is in a critical level or the SIM-2 activity is below a threshold, send a SSM service request message to PLMN-2 using SIM-2 and protocol stack 2 containing at least, but not limited to: the cause of the request, e.g., SIM-2 inactivity or parameter at a critical level, an ID for identifying SIM-1 and an ID for identifying PLMN-1.

If SSM is accepted, receiving a SSM accept response message containing at least but not limited to: FLAG-03 when set to TRUE indicates the data context must be stored; optionally, a value for timer T10; and optionally, a value for timer T20.

The data context is defined as all radio and security configuration that allows the restoration of data communication using minimum signaling.

Timer T10 is the time that the UE needs to wait until a new request for SSM service can be made again. If timer T10 is not configured, a predetermined value must be used.

Timer T20 is used for awaiting a response from PLMN-1. Note that if timer T20 expires and SSM configuration message is not received from PLMN-1, then the UE must maintain the protocol stack 2 active and start timer T10. If timer T20 is not configured, a predetermined value must be used.

If SSM is accepted from PLMN-2, the UE may set the SIM-2 to inactivity state or idle state.

If SSM is not accepted, the UE receives a service reject message containing at least, but not limited to: reject cause #1 indicating the reason for the reject (some reasons for rejection are network failure, authentication error, and so on); e optionally, a value for timer T10.

If Service reject message is received, the UE starts timer T10. Once timer T10 expires, the UE returns to verify the UE activity.

Optionally, receiving a UE assistance information enquiry message from PLMN-1 using SIM-1 and protocol stack 1. This step only occurs if PLMN-1 judges the UE information from PLMN-2 is not enough to compute the SSM parameters. The PLMN-1 can judge the need for additional information when it desires to optimize some specific KPI.

Optionally, sending UE assistance information using SIM-1 and protocol stack 1. In one embodiment, the PLMN-1 may indicate which information must be sent by the UE. In another embodiment, predetermined power saving information or UE resource status are requested, e.g., battery level, temperature, and processing rate.

Receiving a SSM configuration message from PLMN-1 using SIM-1 and protocol stack 1. The message must contain at least, but not limited to, a set of parameters for enabling SSM. Among the parameters, DRX parameters, paging parameters, power saving constraints, quality of service (Qos) requirements, radio resource allocation and so on can be mentioned. These parameters may be optimized to improve the system performance based on a given network KPI.

Once that message is received, timer T10 is stopped and the protocol stack 2 is disabled. Thus, SSM is enabled, and all communications must be performed using SIM-1 and protocol stack 1. If FLAG-03 is set to TRUE the data context must be stored even disabling protocol stack 2. The idea is to minimize the signaling overhead when establishing a new data service to SIM-2.

In one embodiment of the present invention, PLMN-1 may decide to maintain or not the data context of SIM-2 based on some KPI. Thus, UE may receive a FLAG-04 in the set of parameters used for enabling SSM, when set to TRUE indicates that the data context must be removed.

Waiting for an indication to SIM-2 from PLMN-2 using SIM-1 and protocol stack 1. In this indication, it may contain a FLAG-05 when set to TRUE indicates a new service to SIM-2 and protocol stack 2 must be reactivated. During this step, PLMN-1 can send an indication to remove the data context of SIM-2. This can occur for power saving purposes or increasing the resource efficiency of the network.

If a Data service indication message is received, sending a service request to PLMN-2 using SIM-2 and protocol stack 2. If data context is stored, the UE restores the data context and sends a Service request message. Otherwise, the 3GPP-based initial registration procedure must be performed to reestablish a new communication.

In Receiving Connection release message from PLMN-2 using SIM-2 and protocol stack 2 step, the message must contain at least, but not limited to: a FLAG-06 indicating if the SSM must be reestablished or not; optionally, timer T10; and optionally, timer T20.

Finally, if FLAG-06 is set to TRUE, repeating the aforementioned steps, or if FLAG-06 is set to FALSE, the UE start timer T10. Once the timer T10 expires, the UE return to verify UE activity.

The method executed by PLMN-1 comprises the steps of: performing the existing 3GPP-based initial registration procedure of SIM-1 using protocol stack 1, receiving NW SSM service request message from PLMN-2, sending a response to PLMN-2 indicating if the SSM is accepted or not, receiving NW (network) SIM2 information update message from the PLMN-2, sending a response to PLMN-2, optionally, sending a UE assistance information enquiry message to UE, optionally, receiving a UE assistance information message from the UE, computing the SSM parameters, sending a SSM configuration message to UE, monitoring a data service indication from PLMN-2 to SIM-2, if there is data to SIM-2, receiving a NW data service indication from PLMN-2 to inform that there is a new data service to SIM-2, if there is data to SIM-2, sending a NW data service indication complete to PLMN-2, if there is data to SIM-2, sending a Data service indication message to SIM-1 using the protocol stack 1, if FLAG-07 is set to TRUE, repeating the aforementioned steps Otherwise, finishing SSM.

The UE may send a FLAG-01 indicating that the device support SSM using ueCapabilityInformation message.

The PLMN-1 may send a FLAG-02 (e.g., using rrcReconfiguration message) allowing the device to request SSM when needed. FLAG-02 may be updated periodically, on demand, or when mobility is performed.

In the receiving NW SSM service request message from PLMN-2 step, the message must contain at least, but not limited to an ID identifying of SIM-1, an ID identifying of SIM-2, an ID identifying of PLMN-2, the cause of the request, e.g., SIM-2 inactivity or resource in critical level.

In sending a response to PLMN-2 indicating if the SSM is accepted or not step, if SSM is accepted by PLMN-1, sending a NW SSM accept response message. If SSM is not supported, sending a NW service reject message containing at least, but not limited to a reject cause #2 indicating the reason of the reject. Some reject causes are service not supported, network failure and so on In Receiving NW SIM2 information update message from the PLMN-2, this message must contain at least, but not limited to statistic information of SIM-2 data traffic or another information about the SIM-2 usage. For instance, the time of the peak data consumption or the average time of data consumption. PLMN-1 may store and use theses information during the computation of SSM parameters so that improving network KPIs and UE experience.

In sending a response to PLMN-2, if UE information is successfully updated, sending a NW SIM-2 information update complete message. If no UE information is received or occur failures in the update, sending a NW service reject message containing at least, but not limited to a reject cause #3 indicating a failure during the update.

The step of sending a UE assistance information enquiry message to UE step only occurs if PLMN-1 judges that is needed additional UE information to compute the SSM parameters.

In one embodiment, the PLMN-1 may indicate which information must be sent by the UE. In another embodiment, predetermined power saving information or UE resource status are requested, e.g., battery level, temperature and processing rate.

Among the DRX parameters, paging parameters, power saving constraints, QOS requirements, radio resource allocation and so on can be mentioned.

The SSM parameters can be defined by some network function using one or more algorithms able to merge the information of SIM-2 obtained from PLMN-2 and UE, and information of SIM-1 stored in PLMN-1. Moreover, these algorithms can optimize the parameters to increase the system performance in terms of spectral or energy efficiency, delay or any other network KPI.

In sending a SSM configuration message to UE step, a message must contain at least, but not limited to s set of parameters for enabling SSM. Among the DRX parameters, paging parameters, power saving constraints, QOS requirements, radio resource allocation and so on can be mentioned.

In one embodiment of this invention, during this step PLMN-2 may send an indication to remove the data context. This can occur for power saving purposes or increasing the resource efficiency of the network. In this case, PLMN-1 forward this indication using protocol stack 1 to UE.

In another embodiment of the present invention, PLMN-1 may decide to maintain or not the data context of SIM-2 based on some KPI. Thus, PLMN-1 may indicate a FLAG-04 in the set of parameters used for enabling SSM, in addition, PLMN-1 must notify PLMN-2 about that decision and PLMN-2 must confirm the data context remotion.

If there is data to SIM-2, receive a NW data service indication from PLMN-2 to inform that there is a new data service to SIM-2. In this indication, it may contain a FLAG-07 indicating if the SSM must be reestablished or not.

In the indication message may contain a FLAG-05 that, when set to TRUE, indicates a new service to SIM-2 and protocol stack 2 must be reactivated.

The method executed by the network with PLMN-2 comprises the steps of performing the existing 3GPP-based initial registration procedure of SIM-1 using protocol stack 1, sending a NW SSM service request message to PLMN-1, receiving a response from PLMN-1 indicating if the SSM is accepted or not, if SSM is accepted by PLMN-1, sending a NW SIM-2 information update message to PLMN-1, receiving a response from PLMN-1, sending a response message to UE, monitoring if there is data to transmit to SIM-2, if there is data to SIM-2, send a NW data service indication message to PLMN-1 to inform that there is a new data service to SIM-2, receiving a NW data service indication complete from PLMN-1, receiving a service request from SIM-2 using protocol stack 2, sending data to SIM-2, and sending a Connection release message to SIM-2.

The UE may send a FLAG-01 indicating that the device support SSM using ueCapabilityInformation message.

The PLMN-2 may send a FLAG-02 (e.g., using rrcReconfiguration message) allowing the device to request SSM when needed. FLAG-02 may be updated periodically, on demand, or when mobility is performed.

In sending a NW SSM service request message to PLMN-1 step, the message must contain at least, but not limited to an ID identifying of SIM-1, an ID identifying of SIM-2, an ID identifying of PLMN-2. The cause of the request may be, e.g., SIM-2 inactivity or resource in critical level.

If SSM service is accepted by PLMN-1, receiving a NW SSM accept response message. If SSM is not accepted, receiving a NW service reject message containing at least, but not limited to a reject cause #2 indicating the reason of the reject. Some reject causes are network failure, service not supported, and so on The information update message must contain at least, but not limited to statistics information of SIM-2 data traffic or another information about the SIM-2 usage, for example the time of the peak data consumption or the average time of data consumption.

If UE information is updated, receiving a NW SIM-2 Information update complete message. If no UE information is received or occur failures in the update, receiving a NW service reject message containing at least, but not limited to a reject cause #3 indicating a failure during the update.

If SSM service request is accepted, sending a SSM accept response message containing at least, but not limited to: FLAG-03 when set to TRUE indicates the data context must be stored; optionally, timer T10; and optionally, timer T20.

If SSM is not accepted, sending a Service reject message containing at least, but not limited to reject cause #1 indicating the reason of the reject; and optionally, timer T10. Some reasons for reject are service not supported, network failure and so on.

In one embodiment of the present invention, during this step PLMN-2 may send an indication to remove the data context. This can occur for power saving purposes or increasing the resource efficiency of the network. In this case, PLMN-1 forwards this indication using protocol stack 1 to UE.

In another embodiment of this invention, PLMN-1 may decide to maintain or not the data context of SIM-2 based on some KPI, thus, PLMN-1 must notify PLMN-2 about that decision and PLMN-2 must confirm the data context remotion.

The NW data service indication message may contain a FLAG-07 indicating if the SSM must be reestablished or not.

If data context is stored, receiving a Service request message. Otherwise, the 3GPP-based initial registration procedure must be performed to reestablish a new communication.

The message must contain at least, but not limited to a FLAG-06 indicating if the SSM must be reestablished or not. If FLAG-06 is set to TRUE, repeating the aforementioned steps If FLAG-06 is set to FALSE, finishing SSM.

Figure 6:
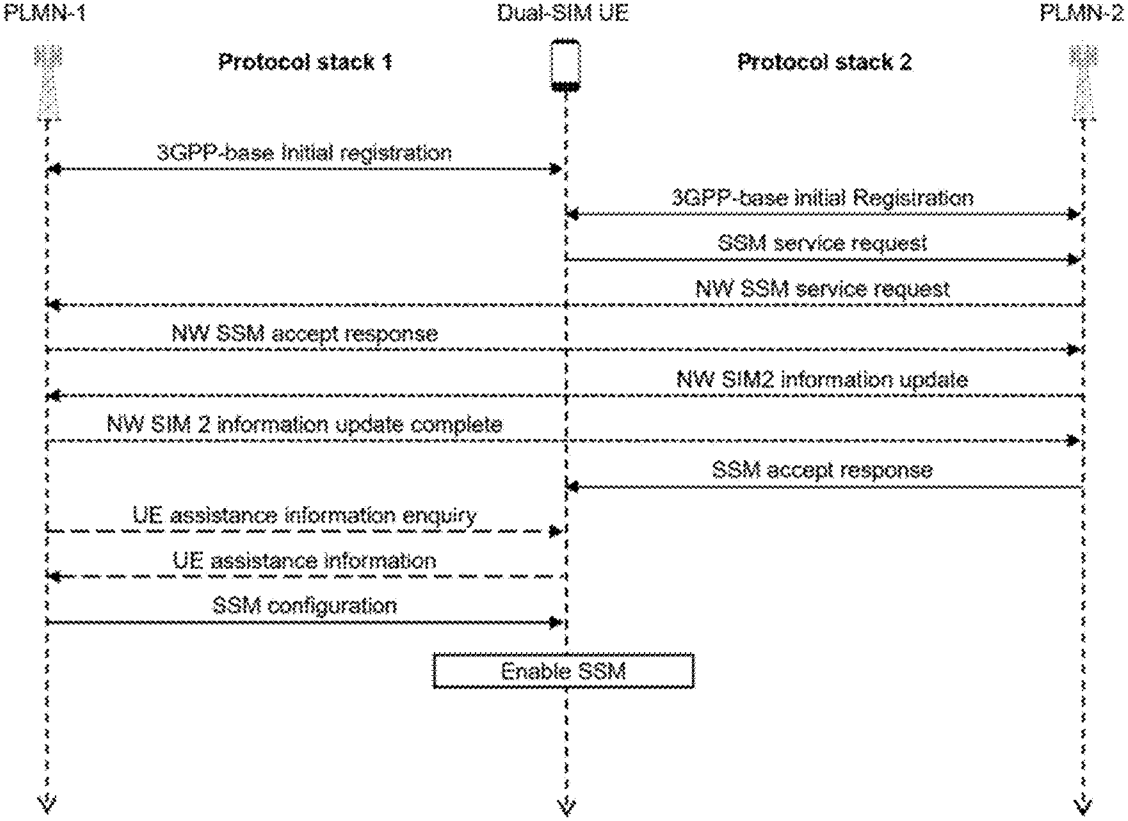
FIG. 6 illustrates signaling exchange between network nodes for enabling SSM considering two different PLMNS according to an embodiment of the present invention.

FIG. 6 presents the signaling exchange needed for enabling SSM in a Dual-SIM device considering two networks with different PLMNs. Note that UE-network signaling is represented by solid lines while network-network signaling is represented by dotted lines. Moreover, optional signaling are shown using dashed lines. In addition, initial registration is performed using protocol stack 1 and stack 2. SIM-2 requests SSM to PLMN-2 using protocol stack 2 and, before sending a response to SIM-2, PLMN-2 exchanges information with PLMN-1 using a network-network signaling. Once PLMN-2 confirms SSM to SIM-2, PLMN-1 can request information from the UE in order to configure the SSM in a more efficient and customized way using protocol stack 1. Finally, PLMN-1 sends the SSM configuration to UE using protocol stack 1 and the UE starts the SSM operation.

Once SSM operation is activated, PLMN-1 is responsible for monitoring and notifying when there is a new data service to SIM-2.

Figure 7:
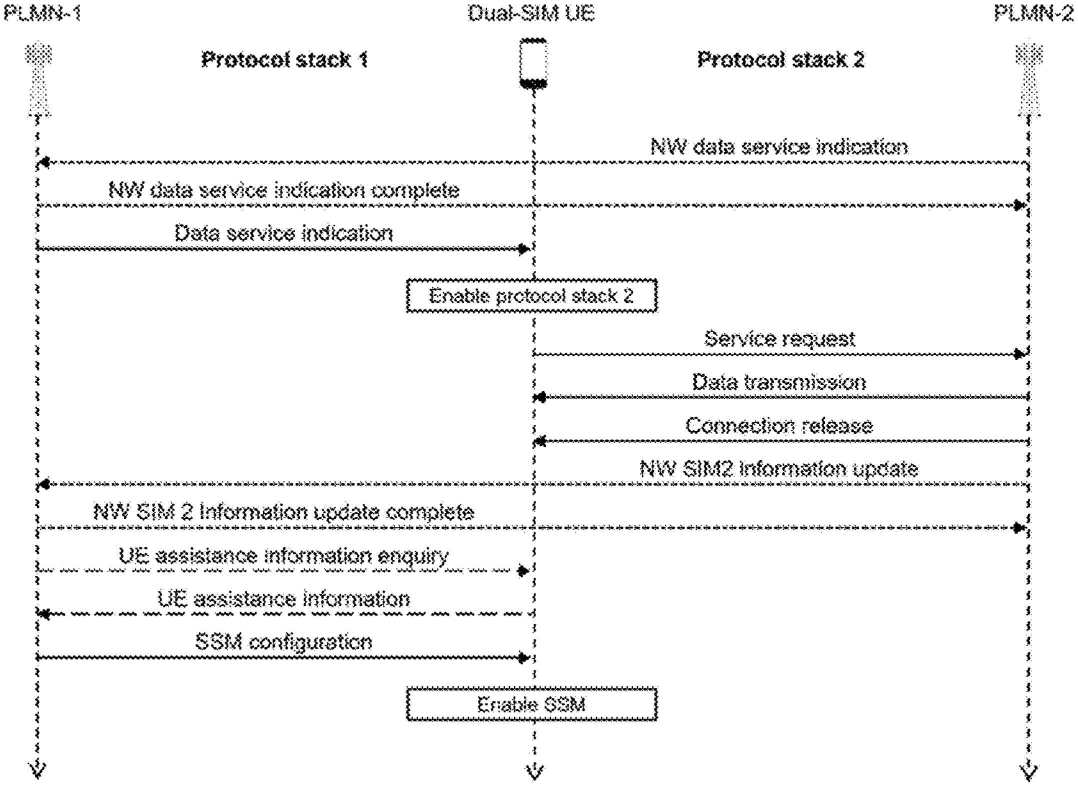
FIG. 7 illustrates signaling exchange between network nodes for establishing a new data service and returning to the SSM considering two different PLMNs to an embodiment of the present invention.

In FIG. 7 is shown the signaling exchange between UE and PLMNs to establish a new data service to SIM-2 when SSM is active and restart the SSM after the data transmission is finished. PLMN-2 informs PLMN-1 about the existence of a new data service to SIM-2. PLMN-1 then forwards the indication to the UE, activating protocol stack 2. Once protocol stack 2 is active, the UE sends a service request to PLMN-2 using protocol stack 2. Finally, a data transmission is established. With the end of the transmission, the SSM can be activated again and, for that, PLMN-1 and PLMN-2 update UE information, and new SSM configuration is sent to UE, which enables SSM.

Figure 8:
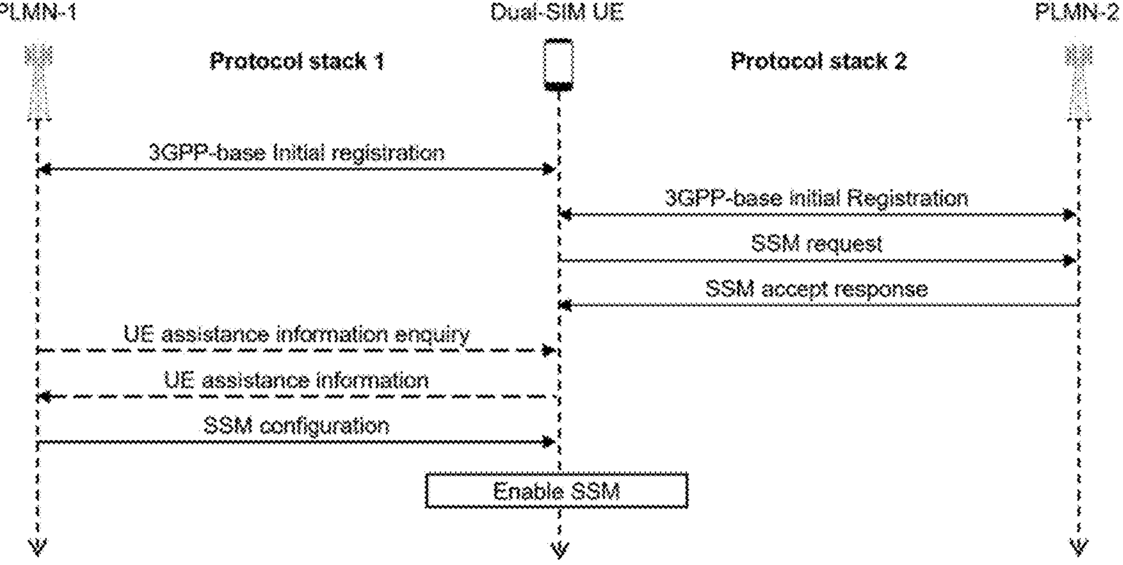
FIG. 8 illustrates signaling exchange between network nodes for enabling SSM considering two equal PLMNS according to an embodiment of the present invention.
Figure 9:
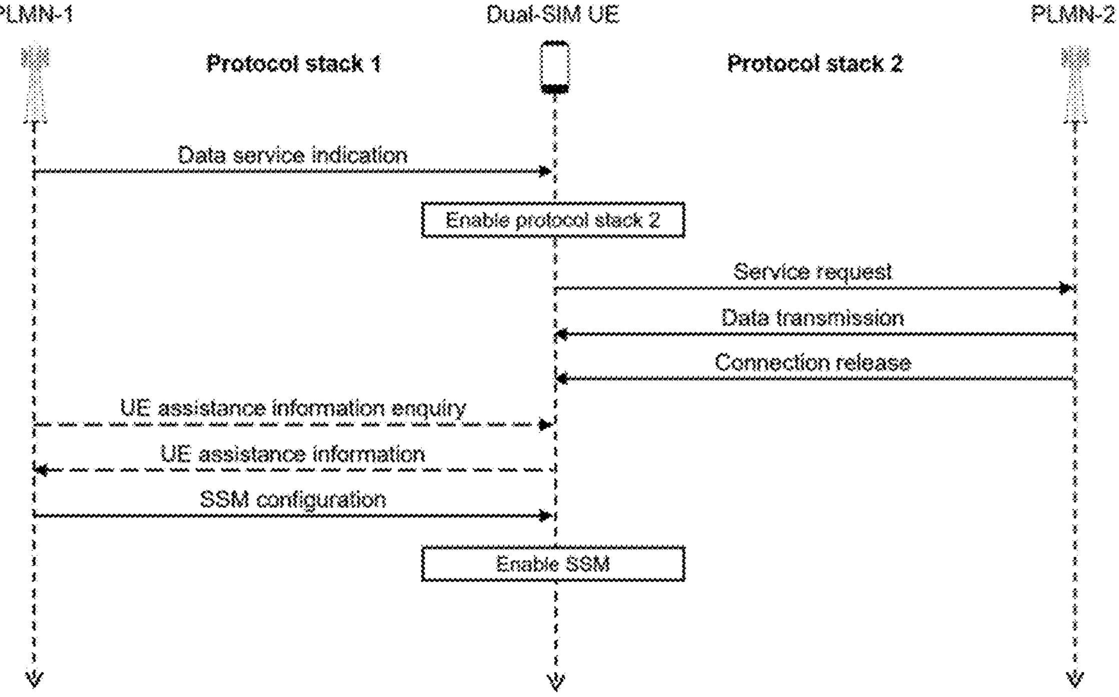
FIG. 9 illustrates signaling exchange between network nodes for establishing a new data service and returning to the SSM considering two equal PLMNs according to an embodiment of the present invention.

In one embodiment of the present invention, the PLMN-1 and PLMN-2 may be the same. FIGS. 8 and 9 show the signaling exchange for that scenario. Network-network signaling is no longer required as the PLMN can process the SIM-2 information locally.

The signaling proposed in the context of the present invention outlines the inter communication between different 3GPP mobile networks, allowing considerable energy saving in Dual-SIM devices. In this method, only one PLMN monitors the service indications, promoting less use of the device radio frequency (RF) circuit. This invention can be applied to 5G and beyond technologies.

The method of the present invention provides reduced power consumption by enabling the SSM in Dual-SIM devices, allows to consider several KPIs/metrics when deciding to enable SSM, wherein the proposed signaling is unique, which easily allows for infringement detections. Besides that, the signaling exchange is optimized to potentially reduce the signaling overhead.

Although the present invention has been described in connection with certain preferred embodiments, it should be understood that it is not intended to limit the disclosure to those particular embodiments. Rather, it is intended to cover all alternatives, modifications, and equivalents possible within the spirit and scope of the disclosure as defined by the appended claims.

The invention claimed is:

1. A method performed by a Dual-SIM UE, a second network node (PLMN-1) and a third network node (PLMN-2), operating in a wireless communication network, the method comprising:

registering SIM-1 and SIM-2 with PLMN-1 and PLMN-2, respectively, the PLMN-1 and PLMN-2 providing network access to the SIM-1 and the SIM-2 for the Dual-SIM UE, respectively, using protocol stack 1 and protocol stack 2, the registering of the SIM-1 being performed using the protocol stack 1 and the registering of the SIM-2 being using the protocol stack 2;

verifying activity of the Dual-SIM UE to decide whether a single stack mode (SSM) operation is to be started;

sending a first indication from the SIM-2 towards the PLMN-2, the first indication requesting establishment of the SSM operation;

forwarding, based on the sending of the first indication, to the PLMN-1 a SSM request for the SSM operation using a second indication from the PLMN-2;

obtaining, based on the sending of the second indication, a set of information from the PLMN-2 to the PLMN-1, indicating statistical information of SIM-2 data traffic and a set of information characterizing usage of the SIM-2, including a time of peak data consumption or an average time of data consumption;

optimizing, based on the obtained set of information, parameters used to configure the SSM operation in relation to a given network KPI;

sending the optimized parameters using a third indication from the PLMN-1 to the SIM-1;

disabling, based on the optimized parameters being received, the protocol stack 2 and starting the SSM operation in the Dual-SIM UE;

monitoring in the PLMN-1 a data service indicating to the SIM-2 from the PLMN-2;

forwarding, based on the received data service indication from the PLMN-2, a data service indicating to the SIM-2 using the protocol stack 1 from the PLMN-1; and enabling, based on the received data service indication in the protocol stack 1, the protocol stack 2 to perform communication between the SIM-2 and the PLMN-2.

2. The method as in claim 1, wherein the registering is performed during initial registration, wherein the method further comprises:

sending the third indication from the Dual-SIM UE to the PLMN-1 and the PLMN-2, the third indication indicating that the SSM operation is supported; and receiving a fourth indication from the PLMN-1 and the PLMN-2 to the Dual-SIM UE, the fourth indication indicating that the Dual-SIM UE is enabled to request SSM operation when needed.

3. The method as in claim 2, wherein the receiving of the fourth indication is performed with a given periodicity, on-demand, or when mobility is performed.

4. The method as in claim 2, wherein the method further comprises:

sending a fifth indication, from the PLMN-1 to the PLMN-2 indicating whether the SSM operation is accepted or not; and forwarding the fifth indication to the Dual-SIM UE using a sixth indication indicating whether the SSM operation is accepted or not.

5. The method as in claim 4, wherein the fifth indication comprises at least one of a reject cause when the SSM operation is not supported by the PLMN-1.

6. The method as in claim 4, wherein the sixth indication comprises at least one of a seventh indication indicating that data context must be stored, a first timer indicating the time that the Dual-SIM UE needs to wait for a response from the PLMN-1, a reject cause when the SSM operation is not supported by the PLMN-2, and a second timer indicating a time that the Dual-SIM UE needs to wait until a new request for SSM service is to be made again.

7. The method as in claim 4, wherein the method further comprises:

updating a state of the SIM-2 an inactive state or an idle state based on the SSM operation being accepted;

starting a first timer based on the SSM operation being accepted; and starting a second timer based on the SSM operation not being accepted, and a reject cause is received.

8. The method as in claim 4, wherein the obtaining of the set of information further comprises:

updating the SIM-2 information in the PLMN-1;

verifying whether the SIM-2 information is sufficient to compute SSM parameters; and sending a seventh indication from the PLMN-1 to the SIM-1 indicating that additional UE information is required based on the SIM-2 information being insufficient.

9. The method as in claim 8, wherein the obtaining of the set of information further comprises an eighth indication indicating information to be sent by the Dual-SIM UE or predetermined power saving information or indicating UE resource status requested.

10. The method as in claim 1, wherein the verifying the activity of the Dual-SIM UE is performed with a periodicity, wherein the method further comprises:

verifying activity of SIM-2 by analyzing a recent usage of SIM-2 for any data transmission;

restating a timer upon a new data activity being perceived in the SIM-2;

monitoring Dual-SIM system resources including battery level, processing, temperature; and defining a threshold for SIM-2 data activity and a critical level for each Dual-SIM system resource analyzed.

11. The method as in claim 1, wherein the sending of the first indication is performed when the Dual-SIM UE is in a critical level, or activity of the SIM-2 is below a threshold, wherein the first indication comprises at least one of a cause of the SSM request, an ID for SIM-1, and an ID for PLMN-1.

12. The method as in claim 1, wherein the second indication comprises at least one of a cause of the SSM request, an ID for SIM-1, an ID for SIM-2, and an ID for PLMN-2.

13. The method as in claim 1, wherein the method further comprises:

applying one or more algorithms able to merge the information of the SIM-2 obtained from the PLMN-2 and the Dual-SIM UE, and information of the SIM-1 stored in the PLMN-1, wherein the one or more algorithms optimize the parameters to increase system performance in terms of spectral or energy efficiency, delay or any other network KPI.

14. The method according to claim 1, wherein the third indication comprises at least one of:

parameters related to DRX configuration;

parameters related to paging configuration;

parameters related to power saving constraints;

parameters related to Qos requirements; and parameters related to a radio resource allocation.

15. The method as in claim 1, wherein the method further comprises stopping a first timer and applying SSM parameters in the Dual-SIM UE.

16. The method as in claim 1, wherein the method further comprises:

updating SSM parameters for optimizing a given KPI; and sending a ninth indication, from PLMN-1 to SIM-1, indicating that data context of SIM-2 based must be removed.

17. The method as in claim 16, wherein the ninth indication is performed with a given periodicity.

18. The method according to claim 16, wherein the method further comprises:

receiving a tenth indication, from the PLMN-2 to the SIM-2, indicating that the communication between the SIM-2 and the PLMN-2 must be released and the SSM operation must be reestablished; and updating the SIM-2 information in the PLMN-1 and the PLMN-2;

optimizing the SSM parameters based on a given KPI; and reestablishing the SSM operation.

* * * * *